Sept. 6, 1927.  E. G. JOHANSON  1,641,493
CREAM SEPARATOR
Filed Aug. 31, 1925
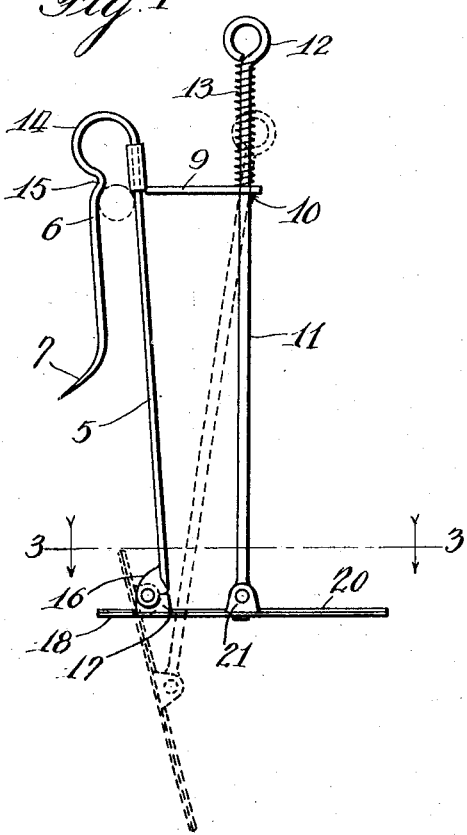
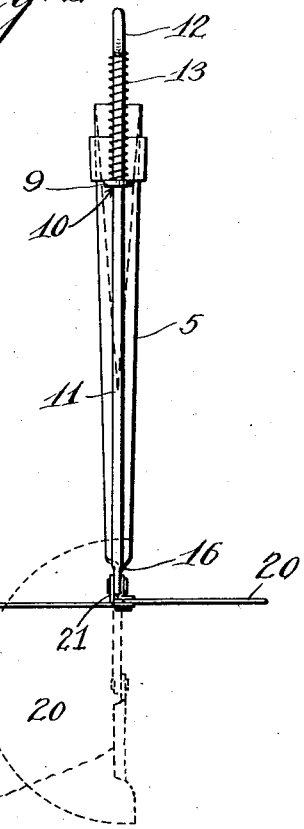
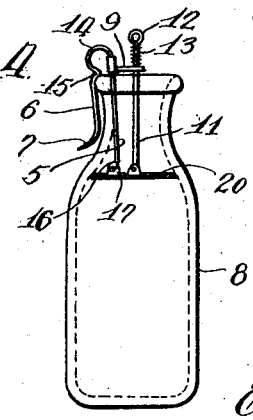
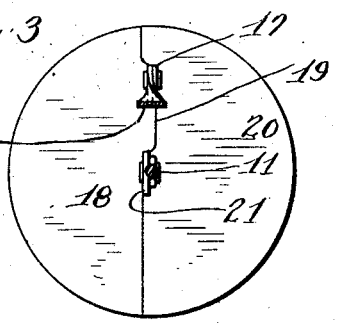
Inventor
Emil Gottfried Johanson
By Chas E Tillman
Atty.

Patented Sept. 6, 1927.

1,641,493

UNITED STATES PATENT OFFICE.

EMIL GOTTFRIED JOHANSON, OF CHICAGO, ILLINOIS.

CREAM SEPARATOR.

Application filed August 31, 1925. Serial No. 53,536.

This invention relates to improvements in a device to be used in connection with ordinary milk bottles for dividing and maintaining separation of the cream and milk contained therein, and it consists in certain peculiarities of the construction, novel arrangement and combination of the various parts thereof, as will be hereinafter more fully set forth and specifically claimed.

The object of the invention is to provide a device of the above named general character, which shall be extremely simple and inexpensive in construction, light in weight, easily applied to and readily removed from a milk bottle, highly efficient in operation and sanitary in use.

Other objects and advantages of the invention will be disclosed in the following description and explanation, which will be more readily understood when read in conjunction with the accompanying drawing, which drawing illustrates an embodiment of which the invention is susceptible, it being obvious that changes and modifications may be resorted to without a departure from the spirit of the invention, so long as they fall within the scope of the appended claims forming a part hereof.

In the drawing,—

Fig. 1 is a detached view in side elevation of a cream separator embodying the invention, showing by dotted lines the position of certain parts of the device may be caused to assume when the device is applied to a bottle for use.

Fig. 2 is a face view looking in the direction indicated by the arrow, displayed near the top of Figure 1.

Fig. 3 is a plan sectional view taken on line 3—3 of Fig. 1, and

Fig. 4 is a reduced view in elevation, showing the device applied to an ordinary milk bottle with its parts in about the positions they will occupy when the cream and milk shall have been separated.

Like numerals of reference refer to corresponding parts throughout the different views of the drawing. The reference numeral 5 designates the main or supporting standard, which is provided at its upper end with a downwardly depending and slightly resilient arm 6, having at its lower end a pointed prod 7 to be used for prying out the bottle stopper or closure, and, together with the yielding arm 6, afford a clamp for engaging the top and outside of the neck of the bottle 8 as shown in Fig. 4 of the drawing. The standard 5 is provided near its upper end with an arm 9, which, when the device is in use, will extend above the mouth of the bottle and said arm has, near its free end, a vertical opening 10 for the reception and operation of a rod 11, which is provided at its upper end with an enlargement 12, by which it may easily be turned or manipulated. Between the inner end of the arm 9 and the enlargement 12 of the rod 11 a spring 13 is coiled around said rod and rests at its lower end against the arm 9 and at its upper end against the enlargement 12 as is clearly shown in the different views of the drawing. The standard 5 is by preference made of flat material and tapers slightly from its lower portion to its upper end, which end is bent outwardly and provided with a loop 14 to afford a spring and to rest on the rim of the bottle and to cause the lower portion 15 of said loop to clamp the outer portion of the bottle rim. The lower end of the standard 5 is twisted to about a right angle to the plane of the said standard thus providing a part 16 which is pivotally connected to an upright lug 17 on the upper surface near its periphery of a semi-circular dividing plate 18. This lug 17 is integral with the member 18 and is upturned as shown in Figs. 1 and 3 for a considerable distance along the straight edge of said plate, thus providing a stop and closure for a slight recess 19 formed on the straight edge of the other semi-circular dividing plate 20 which overlies the plate 18 and is pivotally mounted by means of an upturned lug 21 on the lower end of the operating rod 11, which rod is not only employed for rotating the plate 20 from the position shown in Fig. 3 to that shown by dotted lines in Fig. 2, but for tilting the plates to the dotted line positions shown in Figs. 1 and 2, which is necessary in order that the plates may enter the neck of the bottle. When thus tilted by depressing the rod 11, it is manifest that the loop 14 of the standard 5 will hold the plates 18 and 20 at about the position of the dividing line between the cream and milk, and that by releasing the pressure on the rod 11, the spring 13 will cause the plates to assume about a horizontal position, when, by turning the rod 11 by means of the enlargement 12 in the proper direction, the plate 20 will be rotated from the dotted line position shown in Fig. 2 to about the full line position shown in Figs. 3 and 4 when the recess 19 will co-operate with the upward extension 17 of the plate 18 so as to provide a lock in one direction against the plate 20 turning further. Thus it is obvious that the milk and cream will be divided at their juncture and that as the peripheries of the plates 18 and 20 rest against the inner surface of the bottle, the milk will be firmly held in the bottle, thus allowing the latter to be tilted and the cream to be poured therefrom, after which the device may be removed for use on another bottle. It is apparent that as the prod 7 is pointed and turned outwardly from the standard 5, it will provide a very convenient device for the removal of bottle stoppers and at the same time the arm 6 on which the prod is formed will act as a clamp to hold the device in position on the neck of the bottle.

Having thus fully described my invention, what I claim as new and desire to secure by Letters Patent is:

1. In a device of the class described, the combination with a main standard having means at its upper end to rest on the neck of a milk bottle, of a dividing plate pivotally connected to the lower end of said standard, an inwardly extended apertured arm on said standard, a spring-actuated operating rod extended through said aperture to normally about the lower end of said standard, and another curved dividing plate pivotally mounted on the lower end of said rod.

2. In a device of the class described, the combination with a main standard having means at its upper end to engage the neck of a milk bottle, of a dividing plate pivotally connected to the lower end of said standard, an inwardly extended apertured arm on said standard, a spring-actuated operating rod extended through said aperture to normally about the lower end of said standard, and another curved dividing plate pivotally mounted on the lower end of said rod.

3. In a device of the class described, the combination with a main standard having means at its upper end to rest on the neck of a milk bottle, of a semi-circular dividing plate pivotally connected to the lower end of said standard, an inwardly extended apertured arm on said standard, a spring-actuated operating rod extended through said aperture to normally about the lower end of said standard, and another semi-circular dividing plate pivotally mounted on the lower end of said rod.

4. In a device of the class described, the combination with a main standard having means at its upper end to rest on the neck of a milk bottle, of a semi-circular dividing plate pivotally connected to the lower end of said standard, an inwardly extended apertured arm on said standard, a spring-actuated operating rod extended through said aperture to normally about the lower end of said standard, and another semi-circular dividing plate pivotally mounted on the lower end of said rod and adapted to be turned thereby to cause its straight edge to meet the straight edge of the first named plate and be locked against movement in one direction, the said plates having co-operating means on their straight edges to restrict their upward pivotal movement.

5. In a device of the class described, the combination with a main standard having means at its upper end to engage the upper end and neck of a bottle, of a semi-circular dividing plate having at its straight edge an upwardly extended portion pivotally connected to the lower end of said standard, an inwardly extended apertured arm on said standard, a spring actuated rod extended through said aperture to normally about the lower end of said standard, and another semi-circular dividing plate having in its straight edge a recess to co-operate with said upwardly extending portion of the other plate and pivotally mounted on the lower end of said rod and adapted to be turned thereby to cause its straight edge to meet the straight edge of the first named plate as well as said upward extension.

6. In a cream separator for milk bottles, a pair of semi-circular plates, a pivot-stud attached to one of said plates and holding the other of said plates in pivotal position, an adjacent stud attached to said other plate, a guide-rod pivoted to said adjacent stud and having a handle thereon, a push-rod pivotally connecting with the other stud, and slidable along the guide-rod, whereby the plates may be shifted a quarter turn with respect to the rods, and given a half-turn with respect to each other.

EMIL GOTTFRIED JOHANSON.